United States Patent
Hernandez

(10) Patent No.: US 12,544,036 B2
(45) Date of Patent: Feb. 10, 2026

(54) SYSTEM FOR REMOTE CARDIAC ULTRASONIC MONITORING

(71) Applicant: Lazaro E. Hernandez, Cooper City, FL (US)

(72) Inventor: Lazaro E. Hernandez, Cooper City, FL (US)

( * ) Notice: Subject to any disclaimer, the term of this patent is extended or adjusted under 35 U.S.C. 154(b) by 0 days.

(21) Appl. No.: 19/275,257

(22) Filed: Jul. 21, 2025

(65) Prior Publication Data

US 2025/0345030 A1    Nov. 13, 2025

Related U.S. Application Data

(63) Continuation-in-part of application No. 19/213,833, filed on May 20, 2025, which is a continuation-in-part
(Continued)

(51) Int. Cl.
*A61B 8/00* (2006.01)
*A61B 8/08* (2006.01)

(52) U.S. Cl.
CPC .......... *A61B 8/0883* (2013.01); *A61B 8/4427* (2013.01); *A61B 8/4483* (2013.01);
(Continued)

(58) Field of Classification Search
CPC ................ A61B 8/0883; A61B 8/4427; A61B 8/4483; A61B 8/46; A61B 8/56; A61B 2560/04; A61B 2576/023
See application file for complete search history.

(56) References Cited

U.S. PATENT DOCUMENTS

| | | |
|---|---|---|
| 5,090,410 A | 2/1992 | Saper et al. |
| D327,740 S | 7/1992 | Arioka et al. |

(Continued)

FOREIGN PATENT DOCUMENTS

| | | |
|---|---|---|
| WO | WO2007124126 A3 | 10/2008 |
| WO | WO2009089183 A1 | 7/2009 |
| WO | WO2012005989 A3 | 4/2012 |

OTHER PUBLICATIONS

GE Vivid q Portable Cardiac Ultrasound, https://www.ultrasoundsupply.com/products/ultrasound-machines/ge-ultrasound/ge-vivid-q-portable/.
(Continued)

*Primary Examiner* — Amal Aly Farag

(57) ABSTRACT

A system for remote cardiac ultrasound monitoring is a system that enables the remote monitoring of a cardiac ultrasound in an ambulatory setting. The system includes an ultrasonic transducer, a transducer housing, an electronics housing, a flat rigid interface, a controller, a portable power source, a data/power cable, and a ratchet mechanism. The flat rigid interface enables the removable attachment of the transducer housing to the patient's body. The transducer housing protects the ultrasonic transducer. The ratchet mechanism facilitates the adjustable coupling of the transducer housing to the flat rigid interface. The ultrasonic transducer performs the cardiac ultrasound. The data/power cable enables the direct connection of the ultrasonic transducer to the controller and the portable power source. The controller processes the data captured by the ultrasonic transducer. The portable power source provides the electrical power necessary for the system. The electronics housing protects the portable power source and the controller.

17 Claims, 17 Drawing Sheets

Related U.S. Application Data of application No. 29/983,303, filed on Jan. 9, 2025, now Pat. No. Des. 1,076,107, and a continuation-in-part of application No. 29/983,268, filed on Jan. 9, 2025, now Pat. No. Des. 1,076,106, said application No. 29/983,303 is a continuation-in-part of application No. 29/973,198, filed on Nov. 14, 2024, now Pat. No. Des. 1,076,105, said application No. 19/213,833 is a continuation-in-part of application No. 29/973,198, filed on Nov. 14, 2024, now Pat. No. Des. 1,076,105, said application No. 29/983,268 is a continuation-in-part of application No. 29/973,198, filed on Nov. 14, 2024, now Pat. No. Des. 1,076,105, which is a continuation-in-part of application No. 29/954,765, filed on Jul. 29, 2024, now Pat. No. Des. 1,055,291, which is a continuation-in-part of application No. 18/651,196, filed on Apr. 30, 2024, now Pat. No. 12,178,656, which is a continuation-in-part of application No. 18/471,150, filed on Sep. 20, 2023, now Pat. No. 12,290,407, which is a continuation-in-part of application No. 17/935,505, filed on Sep. 26, 2022, now Pat. No. 11,957,505, which is a continuation-in-part of application No. 17/210,013, filed on Mar. 23, 2021, now Pat. No. 11,457,889.

(52) U.S. Cl.
CPC ............... *A61B 8/46* (2013.01); *A61B 8/56* (2013.01); *A61B 2560/04* (2013.01); *A61B 2576/023* (2013.01)

(56) References Cited

U.S. PATENT DOCUMENTS

| | | | |
|---|---|---|---|
| D360,035 S | 7/1995 | Miller et al. | |
| 5,758,652 A | 6/1998 | Nikolic | |
| 6,080,108 A * | 6/2000 | Dunham | A61B 8/4209 600/459 |
| 6,117,105 A | 9/2000 | Bresnaham et al. | |
| 6,186,955 B1 | 2/2001 | Baura | |
| 6,514,207 B2 | 2/2003 | Ebadollahi et al. | |
| D529,827 S | 10/2006 | Komulainen | |
| 7,666,144 B2 | 2/2010 | Cohen | |
| 8,070,685 B2 | 12/2011 | Harhen et al. | |
| D669,181 S | 10/2012 | Prado | |
| D669,182 S | 10/2012 | Prado | |
| 8,463,361 B2 | 6/2013 | Tupin, Jr. | |
| D686,328 S | 7/2013 | Wung et al. | |
| D743,040 S | 11/2015 | Corbett, III et al. | |
| D746,993 S | 1/2016 | Lewis, Jr. et al. | |
| D764,064 S | 8/2016 | Vezina | |
| D782,684 S | 3/2017 | Pippel et al. | |
| D811,605 S | 2/2018 | Chang | |
| D887,562 S | 6/2020 | de Jonge et al. | |
| D896,973 S | 9/2020 | Wight et al. | |
| D914,220 S | 3/2021 | Nieminen et al. | |
| D926,997 S | 8/2021 | Nieminen et al. | |
| D946,153 S | 3/2022 | Schafer et al. | |
| 2003/0013959 A1 | 1/2003 | Grunwald et al. | |
| 2004/0111045 A1 | 6/2004 | Sullivan et al. | |
| 2006/0122548 A1 | 6/2006 | Abrams | |
| 2006/0173307 A1 | 8/2006 | Amara et al. | |
| 2006/0184051 A1 * | 8/2006 | Hempstead | A61B 5/021 600/485 |
| 2007/0016019 A1 | 1/2007 | Salgo | |
| 2008/0004904 A1 | 1/2008 | Tran | |
| 2008/0281202 A1 | 11/2008 | Fraser et al. | |
| 2008/0312562 A1 | 12/2008 | Routh et al. | |
| 2009/0299155 A1 | 12/2009 | Yang et al. | |
| 2011/0118562 A1 | 5/2011 | Smith et al. | |
| 2011/0313293 A1 * | 12/2011 | Lindekugel | A61B 10/00 600/459 |
| 2013/0041252 A1 | 2/2013 | Vignon et al. | |
| 2014/0012120 A1 | 1/2014 | Cohen et al. | |
| 2015/0011846 A1 | 1/2015 | Chang | |
| 2015/0164468 A1 | 6/2015 | Ahn et al. | |
| 2016/0303307 A1 | 10/2016 | Madjarov et al. | |
| 2017/0124700 A1 | 5/2017 | Sarojam et al. | |
| 2018/0132829 A1 | 5/2018 | Park et al. | |
| 2018/0333050 A1 | 11/2018 | Greiner et al. | |
| 2019/0343484 A1 | 11/2019 | Rothberg et al. | |
| 2020/0121199 A1 | 4/2020 | Freeman et al. | |
| 2020/0397313 A1 | 12/2020 | Attia et al. | |

OTHER PUBLICATIONS

GE Vivid S6 Cardiovascular Ultrasound, https://www.ultrasoundsupply.com/products/ultrasound-machines/ge-ultrasound/ge-vivid-s6/.

Mindray M5 Portable Ultrasound Machine, https://www.mindray.com/au/product/M5_OB.html.

* cited by examiner

SYSTEM FOR REMOTE CARDIAC ULTRASONIC MONITORING

The current application is a continuation-in-part (CIP) application of the U.S. non-provisional utility application Ser. No. 19/213,833 filed on Feb. 20, 2025. The U.S. non-provisional utility application Ser. No. 19/213,833 is a CIP application of the U.S. design application Ser. No. 29/983,303 filed on Jan. 9, 2025. The U.S. design application Ser. No. 29/983,303 is a CIP application of the U.S. design application Ser. No. 29/973,198 filed on Nov. 14, 2024. The U.S. design application Ser. No. 29/973,198 is a CIP application of the U.S. design application Ser. No. 29/954,765 filed on Jul. 29, 2024. The U.S. design application Ser. No. 29/954,765 is a CIP application of the U.S. non-provisional utility application Ser. No. 18/651,196 filed on Apr. 30, 2024. The U.S. non-provisional utility application Ser. No. 18/651,196 is a CIP application of the U.S. non-provisional utility application Ser. No. 18/471,150 filed on Sep. 20, 2023. The U.S. non-provisional utility application Ser. No. 18/471,150 is a CIP application of the U.S. non-provisional utility application Ser. No. 17/935,505 filed on Sep. 26, 2022. The U.S. non-provisional utility application Ser. No. 17/935,505 is a CIP application of the U.S. non-provisional utility application Ser. No. 17/210,013 filed on Mar. 23, 2021.

The current application is also a CIP application of the U.S. non-provisional utility application Ser. No. 19/213,833 filed on Feb. 20, 2025. The U.S. non-provisional utility application Ser. No. 19/213,833 is a CIP application of the U.S. design application Ser. No. 29/983,268 filed on Jan. 9, 2025. The U.S. design application Ser. No. 29/983,268 is a CIP application of the U.S. design application Ser. No. 29/973,198 filed on Nov. 14, 2024. The U.S. design application Ser. No. 29/973,198 is a CIP application of the U.S. design application Ser. No. 29/954,765 filed on Jul. 29, 2024. The U.S. design application Ser. No. 29/954,765 is a CIP application of the U.S. non-provisional utility application Ser. No. 18/651,196 filed on Apr. 30, 2024. The U.S. non-provisional utility application Ser. No. 18/651,196 is a CIP application of the U.S. non-provisional utility application Ser. No. 18/471,150 filed on Sep. 20, 2023. The U.S. non-provisional utility application Ser. No. 18/471,150 is a CIP application of the U.S. non-provisional utility application Ser. No. 17/935,505 filed on Sep. 26, 2022. The U.S. non-provisional utility application Ser. No. 17/935,505 is a CIP application of the U.S. non-provisional utility application Ser. No. 17/210,013 filed on Mar. 23, 2021.

The current application also claims a priority to the U.S. provisional patent application Ser. No. 63/739,086 filed on Dec. 26, 2024.

FIELD OF THE INVENTION

The present invention generally relates to telemedicine and wearable medical devices. More specifically, the present invention discloses novel means of remotely monitoring a cardiac ultrasound being performed on a patient.

BACKGROUND OF THE INVENTION

In general, cardiac ultrasounds, also known as echocardiograms, are non-invasive medical examination procedures where the heart and nearby blood vessels are monitored to detect cardiac issues in a patient. Cardiac ultrasounds are often performed in a medical facility due to the different medical instruments that are necessary to perform the procedure. Due to this limitation, patients are required to travel to the medical facility, which can be an issue for patients who may not be able to do so. In addition, limiting cardiac ultrasounds to medical facilities can also limit the effectiveness of patient care if the healthcare provider requires periodic cardiac ultrasounds. Most people live hectic lives which prevents them from continuously visiting the healthcare facility to receive a cardiac ultrasound. Patients with cardiac conditions in intensive care units, as a measure of safety, after improving from their acute illnesses, are usually kept in the hospital to undergo follow-up cardiac ultrasounds for a few days before discharged. So, being able for patients or caregivers to remotely perform their own cardiac ultrasounds would be beneficial to the patients and healthcare.

Therefore, the objective of the present invention is to provide a system for remote cardiac ultrasound monitoring. The present invention allows a cardiac ultrasound to be performed remotely from home, or from an ambulatory setting, while allowing the corresponding healthcare provider to review and interpret the acquired ultrasound images in real time. Another objective of the present invention is to provide a system that can be easily operated by the patient or caregiver during the medical procedure. The present invention's system provides a portable kit that allows the cardiac ultrasound to be performed without direct assistance from the healthcare provider. The portable kit includes means to facilitate the fastening of the examination instruments to the patient's body without specialized tools or assistance from another person. Additional features and benefits of the present invention are further discussed in the sections below.

SUMMARY OF THE INVENTION

The present invention discloses a system for remote cardiac ultrasound monitoring. The present invention's system enables healthcare providers to remotely monitor a cardiac ultrasound being performed on a patient in an ambulatory setting. In the preferred embodiment, the present invention's system includes, but is not limited to, an ultrasonic transducer, a flat rigid interface, and a data acquisition unit. The flat rigid interface corresponds to the skin interface attached to the patient's body adjacent to the target examination area. The ultrasonic transducer is a hands free, portable transducer that can perform the cardiac ultrasound. The data acquisition unit corresponds to a computing device that processes the data signals from the ultrasonic transducer. The data acquisition unit also enables the wireless transmission of the processed data to a healthcare database from which the corresponding healthcare provider can access the data to remotely monitor the cardiac ultrasonic procedure. After the flat rigid interface is placed and secured by the healthcare provider in the desired position, the patient is given the ultrasonic transducer and the data acquisition unit to take home after receiving instructions from the healthcare provider.

Further, the present invention's system can include a software application that can be installed on the patient's computing device to control the operation of the data acquisition unit and the ultrasonic transducer remotely. The patient's computing device can include, but is not limited to, a smartphone, personal computer, etc., with wireless capabilities and an Internet connection so that the collected data can be relayed to the healthcare database via the computing device's Internet connection.

Further, the present invention's system enables the implementation of a method that includes an overall process where a small ultrasonic loop (e.g., 3 to 5 seconds) is recorded for a time period. The recorded ultrasonic loop is then relayed to the corresponding healthcare database, via the patient's computing device with the installed system's software application, for remote examination by the corresponding healthcare provider. In other embodiments, the present invention may implement a user interface such as a touchscreen from which the patient may directly engage the ultrasonic transducer without the use of an external computing device.

DETAILED DESCRIPTION OF THE INVENTION

Figure 1:
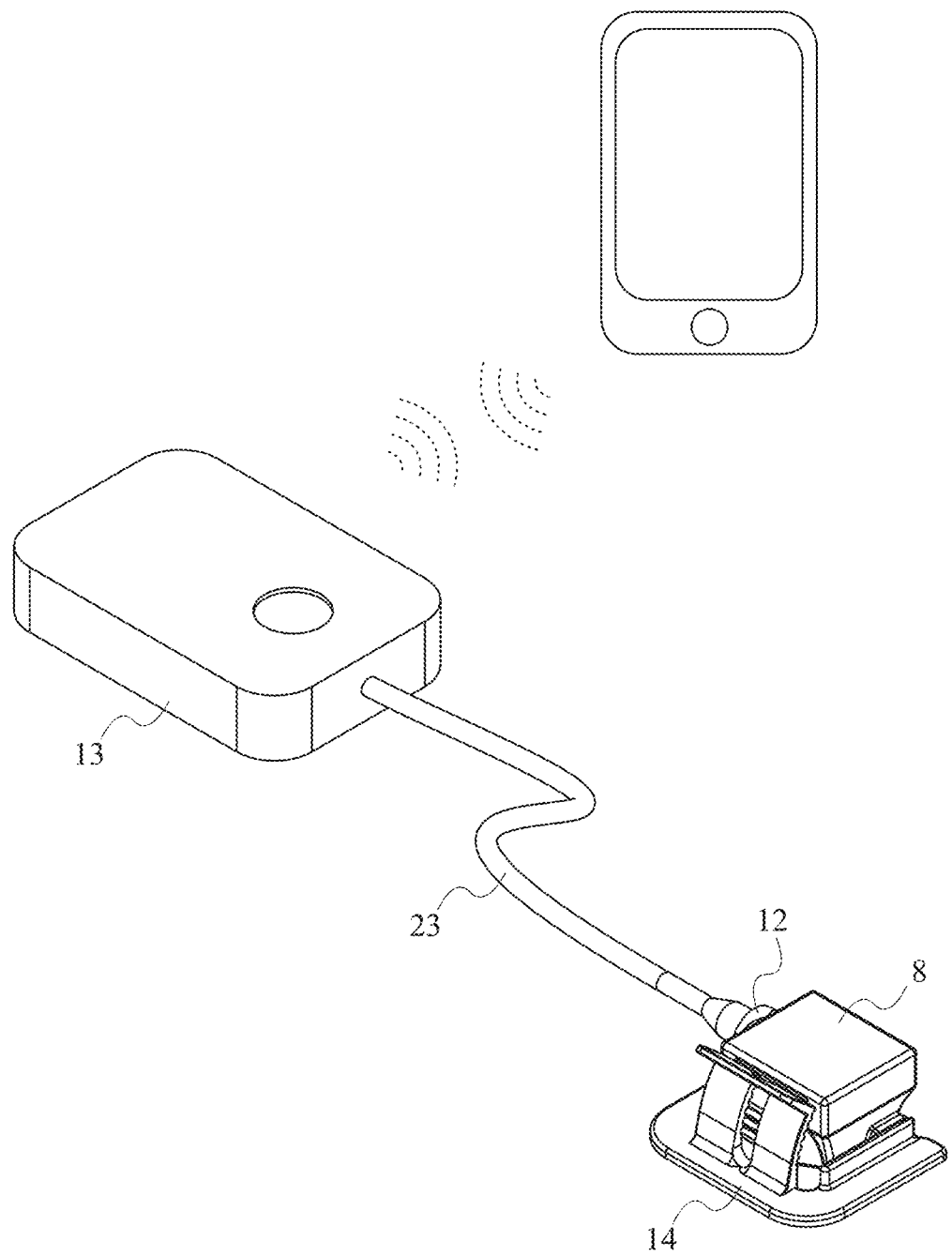
FIG. 1 is a top-front-left perspective view of the system of the present invention.
Figure 2:
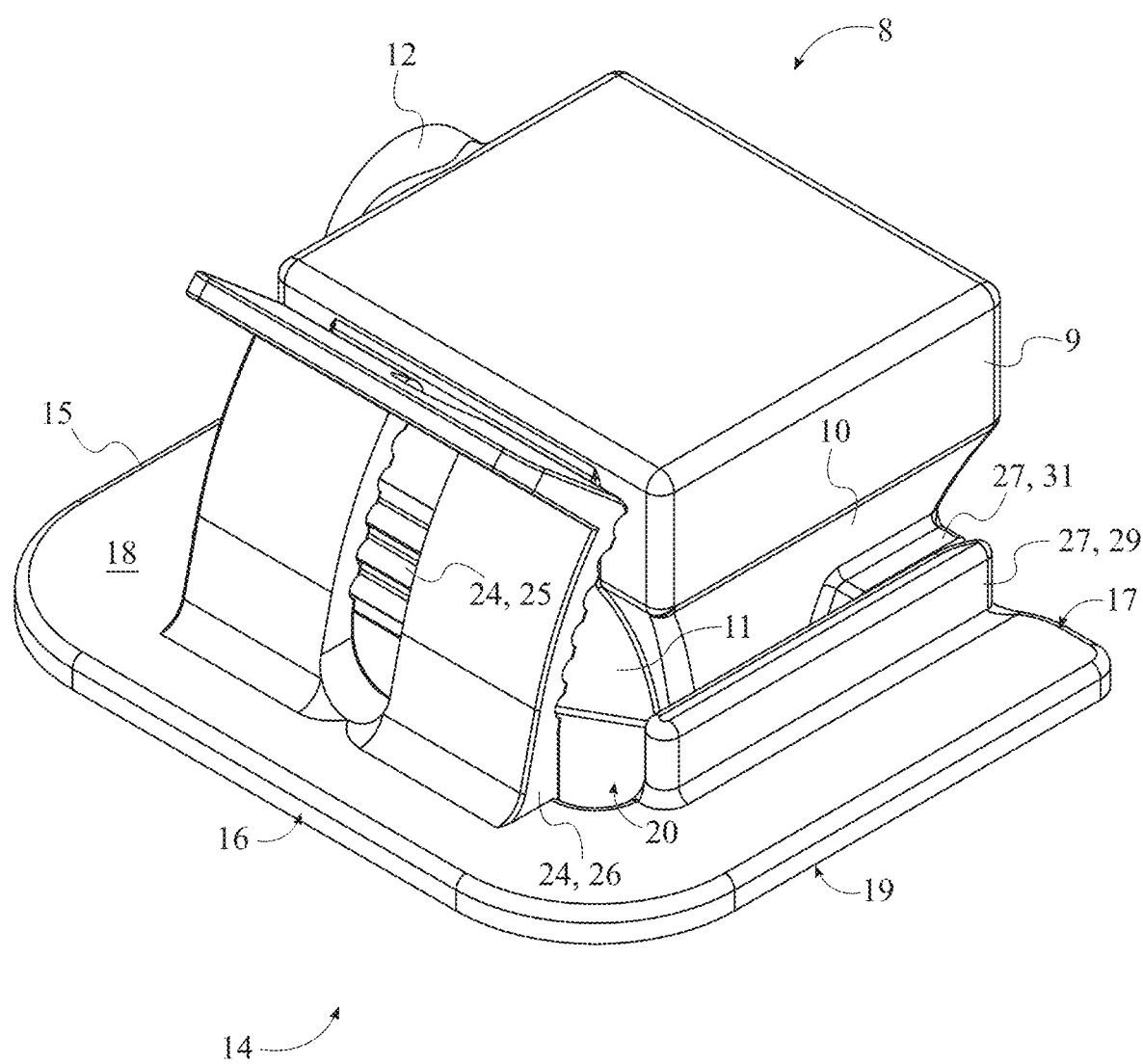
FIG. 2 is a top-front-left perspective view of the system of the present invention, wherein the transducer housing and the flat rigid interface are shown.
Figure 3:
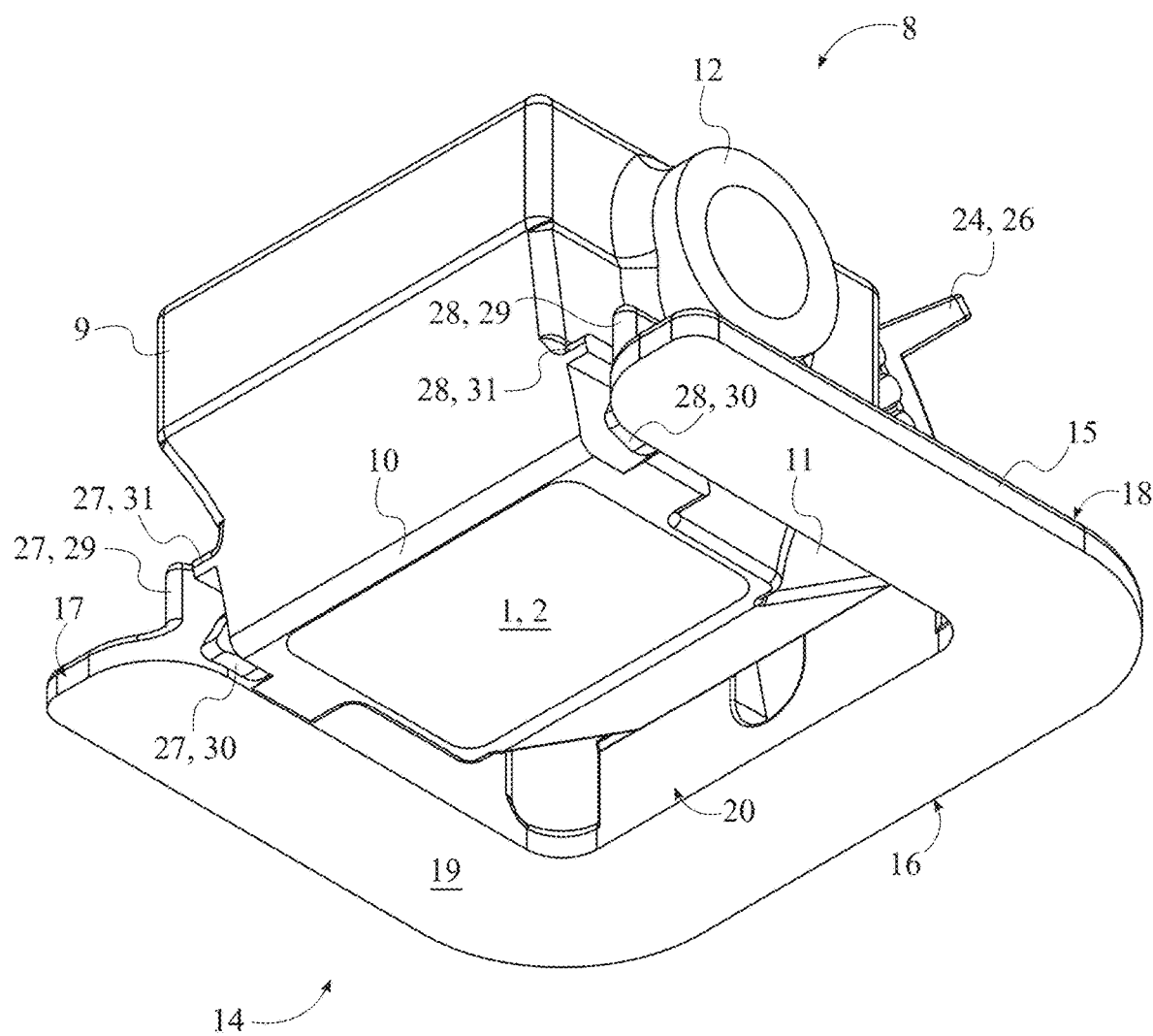
FIG. 3 is a bottom-rear-right perspective view of the system of the present invention, wherein the transducer housing and the flat rigid interface are shown.

All illustrations of the drawings are for the purpose of describing selected versions of the present invention and are not intended to limit the scope of the present invention.

The present invention discloses a system and method for remote cardiac ultrasound monitoring. The present invention enables the remote monitoring of a cardiac ultrasound by a healthcare provider in an ambulatory setting. As can be seen in FIGS. 1 through 15, the present invention's system preferably comprises an ultrasonic transducer 1, a transducer housing 8, an electronics housing 13, a flat rigid interface 14, a controller 21, a portable power source 22, a data/power cable 23, and a ratchet mechanism 24. The flat rigid interface 14 enables the removable attachment of the transducer housing 8 to the patient's body adjacent to the target examination area. The transducer housing 8 supports the operation of the ultrasonic transducer 1 while protecting the electronics of the ultrasonic transducer 1. The ratchet mechanism 24 facilitates the adjustable coupling of the transducer housing 8 to the flat rigid interface 14.

Further, the ultrasonic transducer 1 is a portable medical probe able to perform the cardiac ultrasound, as can be seen in FIGS. 1 through 15. The data/power cable 23 enables the direct connection of the ultrasonic transducer 1 to the controller 21 and the portable power source 22. The controller 21, the portable power source 22, and the electronics housing 13 form the data acquisition unit of the system. The controller 21 corresponds to the computing device that processes the data captured by the ultrasonic transducer 1. The portable power source 22 provides the electrical power necessary for the operation of the electrical and electronic components of the system. The electronics housing 13 supports the operation of the controller 21 and the portable power source 22. The electronics housing 13 also protects the electronics of the controller 21 and the portable power source 22.

The general configuration of the aforementioned components enables the remote monitoring of a medical ultrasound without direct physical input of a healthcare provider. As can be seen in FIGS. 1 through 15, the transducer housing 8 is designed to be removably coupled to the flat rigid interface 14 by the patient in an easy manner without help from the healthcare provider or without the use of external tools. The transducer housing 8 can have different structural shapes and sizes depending on the ultrasonic transducer 1 being implemented. However, the transducer housing 8 generally comprises an upper housing base 9 and a lower housing base 10 corresponding to opposite bases of the transducer housing 8.

In general, the present invention's system can be implemented as follows: the ultrasonic transducer 1 is mounted within the transducer housing 8, adjacent to the lower housing base 10, as can be seen in FIGS. 1 through 15. The lower housing base 10 is designed to orient the ultrasonic transducer 1 towards the target body area to be examined. In addition, the controller 21 and the portable power source 22 are mounted within the electronics housing 13 so that the electronics housing 13 encloses the controller 21 and the portable power source 22. The shape and size of the electronics housing 13 depends on the system's specifications, but the overall structural design is portable. For example, the electronics housing 13 can have an overall oval flat shape large enough to accommodate the electrical and electronic components of the controller 21 and the portable power source 22.

Further, the electronics housing 13 is tethered to the transducer housing 8 by the data/power cable 23 to secure the electronics housing 13 to the transducer housing 8, as can be seen in FIGS. 1 through 15. For example, the data/power cable 23 can be a coaxial cable that physically connects the electronics housing 13 to the transducer housing 8 while enabling the necessary electrical and electronic connections to be formed. In addition, the transducer housing 8 can be hingedly connected to the flat rigid interface 14 to secure the transducer housing 8 to the flat rigid interface 14. The ratchet mechanism 24 is also operatively coupled between the flat rigid interface 14 and the transducer housing 8. The ratchet mechanism 24 is used to incrementally orient the transducer housing 8 at a specific angle with the flat rigid interface 14. In other words, the patient can adjust the orientation of the ultrasonic transducer 1 by changing the angle between the transducer housing 8 and the flat rigid interface 14.

Further, the portable power source 22 is electrically connected to the controller 21 to provide the electricity necessary for the operation of the controller 21, as can be seen in FIGS. 1 through 15. The portable power source 22 can be one or more portable batteries mounted within the electronics housing 13. The portable batteries can be rechargeable batteries that can be recharged via a charging port on the electronics housing 13 or disposable batteries that can be replaced once empty. The type and capacity of the portable power source 22 depends on the overall operational specifications of the system. Moreover, the controller 21 is electronically connected to the ultrasonic transducer 1 by the data/power cable 23 to enable the relay of electronic signals between the controller 21 and the ultrasonic transducer 1. Furthermore, the portable power source 22 is electrically connected to the ultrasonic transducer 1 by the data/power cable 23 to provide the electricity necessary for the operation of the ultrasonic transducer 1.

As previously discussed, the flat rigid interface 14 enables the removable attachment of the transducer housing 8 to the patient's body. As can be seen in FIGS. 1 through 13, the flat rigid interface 14 is preferably designed to be securely attached to the patient's body by the healthcare provider so that the ultrasonic transducer 1 is correctly positioned over the target body area during the remote ultrasound procedure. In general, the flat rigid interface 14 comprises an interface base 15 and a transducer-receiving hole 20. The interface base 15 corresponds to the main structure of the flat rigid interface 14, while the transducer-receiving hole 20 corresponds to the space on the flat rigid interface 14 that accommodates the transducer housing 8. In addition, the interface base 15 comprises a proximal base edge 16, a distal base edge 17, an upper base face 18, and a lower base face 19. The proximal base edge 16 and the distal base edge 17 correspond to two opposite edges of the interface base 15. Similarly, the upper base face 18 and the lower base face 19 correspond to the two largest opposite flat surfaces of the interface base 15.

In general, the flat rigid interface 14 is implemented as follows: the proximal base edge 16 is positioned opposite the distal base edge 17 across the interface base 15, as can be seen in FIGS. 1 through 13. The interface base 15 is preferably an overall rectangular flat structure, so the proximal base edge 16 and the distal base edge 17 can be the two longest edges of the interface base 15. Further, the upper base face 18 is positioned opposite the lower base face 19 about the interface base 15 due to the flat structural design of the interface base 15. Moreover, the transducer-receiving hole 20 traverses from the upper base face 18, through the interface base 15, and to the lower base face 19, to form a space large enough to allow portions of the transducer housing 8 to pass through the interface base 15. For example, the lower housing base 10 can be positioned through the transducer-receiving hole 20 as the ultrasonic transducer 1 is positioned adjacent to the lower housing base 10.

Further, the transducer-receiving hole 20 also traverses from the distal base edge 17 and into the interface base 15 to form a fork-like design, as can be seen in FIGS. 1 through 13. So, when the transducer housing 8 is coupled to the flat rigid interface 14, the transducer housing 8 is aligned with the transducer-receiving hole 20. The transducer-receiving hole 20 is generally a rectangular hole, and the lower housing base 10 also has rectangular design which allows the lower housing base 10 to move through the transducer-receiving hole 20. Furthermore, the transducer housing 8 is hingedly mounted to the upper base face 18, adjacent to the distal base edge 17 so that the angular orientation can be adjusted using the ratchet mechanism 24. In other embodiments, the flat rigid interface 14 can be modified to accommodate different designs of the transducer housing 8.

As previously discussed, the ratchet mechanism 24 allows the patient to adjust the angular orientation of the transducer housing 8 on the flat rigid interface 14. In the preferred embodiment, the ratchet mechanism 24 may comprise a ratchet pawl 25 and a ratchet rack 26 corresponding to the common parts of a ratchet mechanism 24, as can be seen in FIGS. 1 through 13. In addition, the transducer housing 8 may further comprise a slanted protrusion 11 that helps orient the ratchet pawl 25 towards the ratchet rack 26 when coupled together.

As can be seen in FIGS. 1 through 13, the ratchet mechanism 24 can be implemented on the flat rigid interface 14 as follows: the ratchet rack 26 is connected onto the upper base face 18, adjacent to the proximal base edge 16, to secure the ratchet rack 26 to the interface base 15. The ratchet rack 26 is preferably a curved thin rack that can be pulled to engage/disengage the ratchet mechanism 24. In addition, the ratchet rack 26 is oriented towards the distal base edge 17 so that the ratchet rack 26 engages the ratchet pawl 25 on the transducer housing 8. Further, the slanted protrusion 11 is laterally connected to the transducer housing 8 in between the upper housing base 9 and the lower housing base 10. This forms a curved lateral protrusion on the side of the transducer housing 8 that matches the curvature of the ratchet rack 26. Further, the slanted protrusion 11 is positioned adjacent to the ratchet rack 26 to allow the ratchet rack 26 to engage the ratchet pawl 25. The ratchet pawl 25 is connected onto the slanted protrusion 11, offset from the transducer housing 8, to secure the ratchet pawl 25 to the transducer housing 8. In addition, the ratchet pawl 25 is oriented towards the ratchet rack 26 to ensure that the ratchet pawl 25 engages the ratchet rack 26. Furthermore, the ratchet pawl 25 is selectively engaged with the ratchet rack 26 to adjust the angular orientation of the transducer housing 8 with the interface base 15.

As previously discussed, the hinged connection between the transducer housing 8 and the flat rigid interface 14 allows the adjustment of the angular orientation of the transducer housing 8 using the ratchet mechanism 24, as can be seen in FIGS. 1 through 13. In addition, the hinged connection is designed to enable the removable coupling of the transducer housing 8 to the flat rigid interface 14. To do so, the present invention's system may further comprise a first hinge mechanism 27 and a second hinge mechanism 28 that allow the removable coupling of the transducer housing 8 to the flat rigid interface 14. In addition, the first hinge mechanism 27 and the second hinge mechanism 28 each comprise a flat protrusion 29, a hinge pin 30, and a pin hook 31 that enable the implementation of each hinge mechanism on the transducer housing 8 and the flat rigid interface 14.

As can be seen in FIGS. 1 through 13, the first hinge mechanism 27 and the second hinge mechanism 28 can be implemented as follows: the first hinge mechanism 27 and the second hinge mechanism 28 are positioned opposite to each other about the transducer housing 8 to ensure that the transducer housing 8 can be securely coupled to the flat rigid interface 14. Further, the flat protrusion 29 of the first hinge mechanism 27 is connected onto the upper base face 18, adjacent to the transducer-receiving hole 20. Similarly, the flat protrusion 29 of the second hinge mechanism 28 is connected onto the upper base face 18, adjacent to the transducer-receiving hole 20. Each flat protrusion 29 is preferably oriented perpendicular to the upper base face 18 to surround the transducer housing 8 on both sides.

Further, each hinge pin 30 is connected onto the corresponding flat protrusion 29 to incorporate the hinge pin 30 on the lateral side of the flat protrusion 29, as can be seen in FIGS. 1 through 13. The hinge pin 30 of the first hinge mechanism 27 and the hinge pin 30 of the second hinge mechanism 28 are also oriented towards each other so that each hinge pin 30 is oriented towards the transducer-receiving hole 20. Moreover, the hinge pin 30 of the first hinge mechanism 27 and the hinge pin 30 of the second hinge mechanism 28 are concentrically positioned to each other to evenly position the transducer housing 8 on the flat rigid interface 14. Similarly, the pin hook 31 of the first hinge mechanism 27 and the pin hook 31 of the second hinge mechanism 28 are laterally integrated into the transducer housing 8, adjacent to the lower housing base 10. This way, the position and orientation of each pin hook 31 matches the position and orientation of the corresponding hinge pin 30. Furthermore, to hingedly connect the transducer housing 8 to the flat rigid interface 14, each hinge pin 30 is rotatably attached into the corresponding pin hook 31. In other embodiments, different hinge mechanisms can be implemented that allow the removable coupling of the transducer housing 8 to the flat rigid interface 14.

Figure 13:
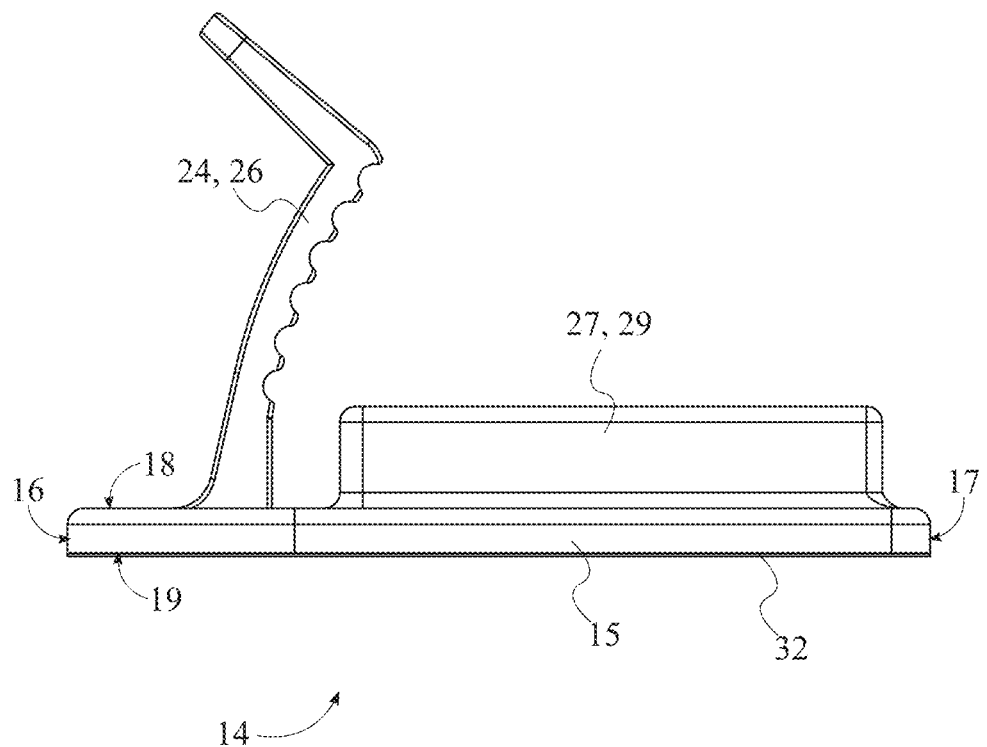
FIG. 13 is a left view of the flat rigid interface of the system of the present invention, wherein the lower base face of the flat rigid interface is shown with adhesive.

As previously discussed, the flat rigid interface 14 is attached to the patient's body by the healthcare practitioner to ensure that the ultrasonic transducer 1 is always oriented towards the target body area. As can be seen in FIG. 13, to facilitate the safe attachment of the flat rigid interface 14 to the patient's body, the present invention's system may further comprise a quantity of adhesive 32 that is safe to use on the skin. For example, the quantity of adhesive 32 can be a body adhesive or a length of double-sided tape that is safe to use on the skin. Further, the quantity of adhesive 32 is superimposed across the lower base face 19 so that the lower base face 19 can be safely attached to the target body area. In some embodiments, a base cover can be provided that encloses the flat rigid interface 14 when not in use. The base cover enables the flat rigid interface 14 to be comfortably worn under clothing so that the patient does not remove the flat rigid interface 14.

The transducer housing 8 is preferably tethered to the electronics housing 13 using the data/power cable 23 for ease of use and to prevent misplacing either component. However, the use of a wired connection instead of a wireless connection can cause some complications for the patient. As can be seen in FIGS. 1 through 15, to ensure that data/power cable 23 does not obstruct the operation of the ultrasonic transducer 1, the transducer housing 8 may further comprise a cable port 12 that orients the data/power cable 23 away from the ultrasonic transducer 1. To do so, the cable port 12 is laterally integrated into the transducer housing 8, adjacent to the upper housing base 9, to position the cable port 12 away from the ultrasonic transducer 1. Further, a central axis 33 of the cable port 12 is positioned perpendicular to an emission axis 34 of the ultrasonic transducer 1. This way, the cable port 12 ensures that the data/power cable 23 does not compromise the orientation of the transducer housing 8 on the flat rigid interface 14. Furthermore, the data/power cable 23 is terminally attached into the cable port 12 to secure the data/power cable 23 to the cable port 12.

Figure 15:
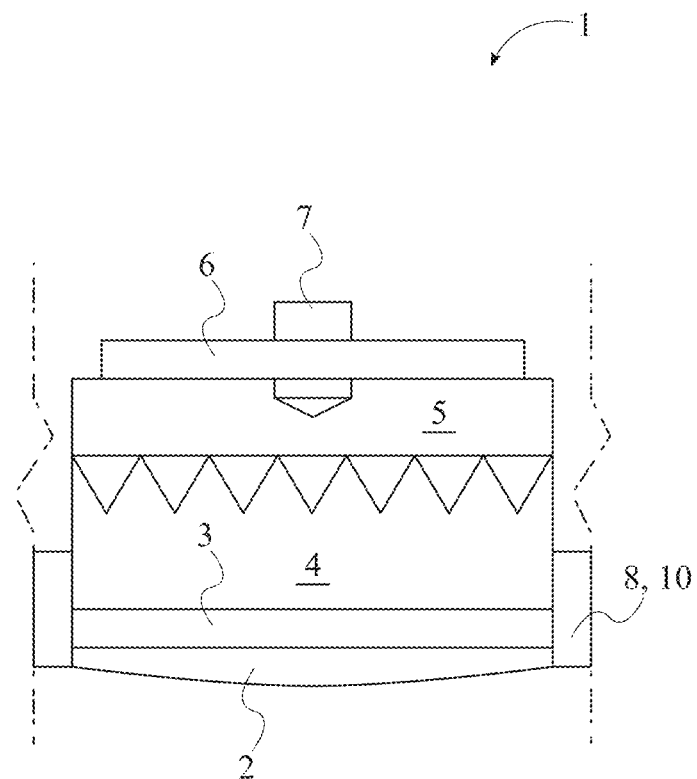
FIG. 15 is a schematic cross-sectional view of the ultrasonic transducer of the system of the present invention.

Different ultrasound technologies can be implemented for the ultrasonic transducer 1 according to the system's specifications. In general, the ultrasonic transducer 1 comprises a footprint 2, a piezoelectric crystal arrangement 3, a backing 4, a stiffener 5, a flex circuit 6, and a connector 7, as can be seen in FIG. 15. The footprint 2 corresponds to the structure of the ultrasonic transducer 1 that comes into contact with the patient's body. The piezoelectric crystal arrangement 3 convert electrical energy into sound waves and vice versa. The backing 4 and stiffener 5 helps dampen the generated sound waves to improve image quality. The flex circuit 6 enables the automatic operation of the ultrasonic transducer 1, and the connector 7 allows the electrical and electronic connection of the flex circuit 6 to the portable power source 22 and the controller 21, respectively.

In general, the ultrasonic transducer 1 can be implemented as follows: the footprint 2 is integrated into the lower housing base 10 so that the orientation of the ultrasonic transducer 1 matches the orientation of the lower housing base 10, as can be seen in FIG. 15. Further, the piezoelectric crystal arrangement 3 is mounted within the transducer housing 8, adjacent to the footprint 2, so that the piezoelectric crystal arrangement 3 is protected by the transducer housing 8. The backing 4 is mounted across the piezoelectric crystal arrangement 3, opposite to the footprint 2. In addition, the stiffener 5 is mounted across the backing 4, opposite to the piezoelectric crystal arrangement 3. This forms a layered arrangement for the piezoelectric crystal arrangement 3, the backing 4, and the stiffener 5. Further, the flex circuit 6 is mounted across the stiffener 5, opposite to the backing 4, so secure the flex circuit 6 to the stiffener 5. An additional stiffener 5 for the flex circuit 6 can implemented to support the flex circuit 6.

Figure 14:
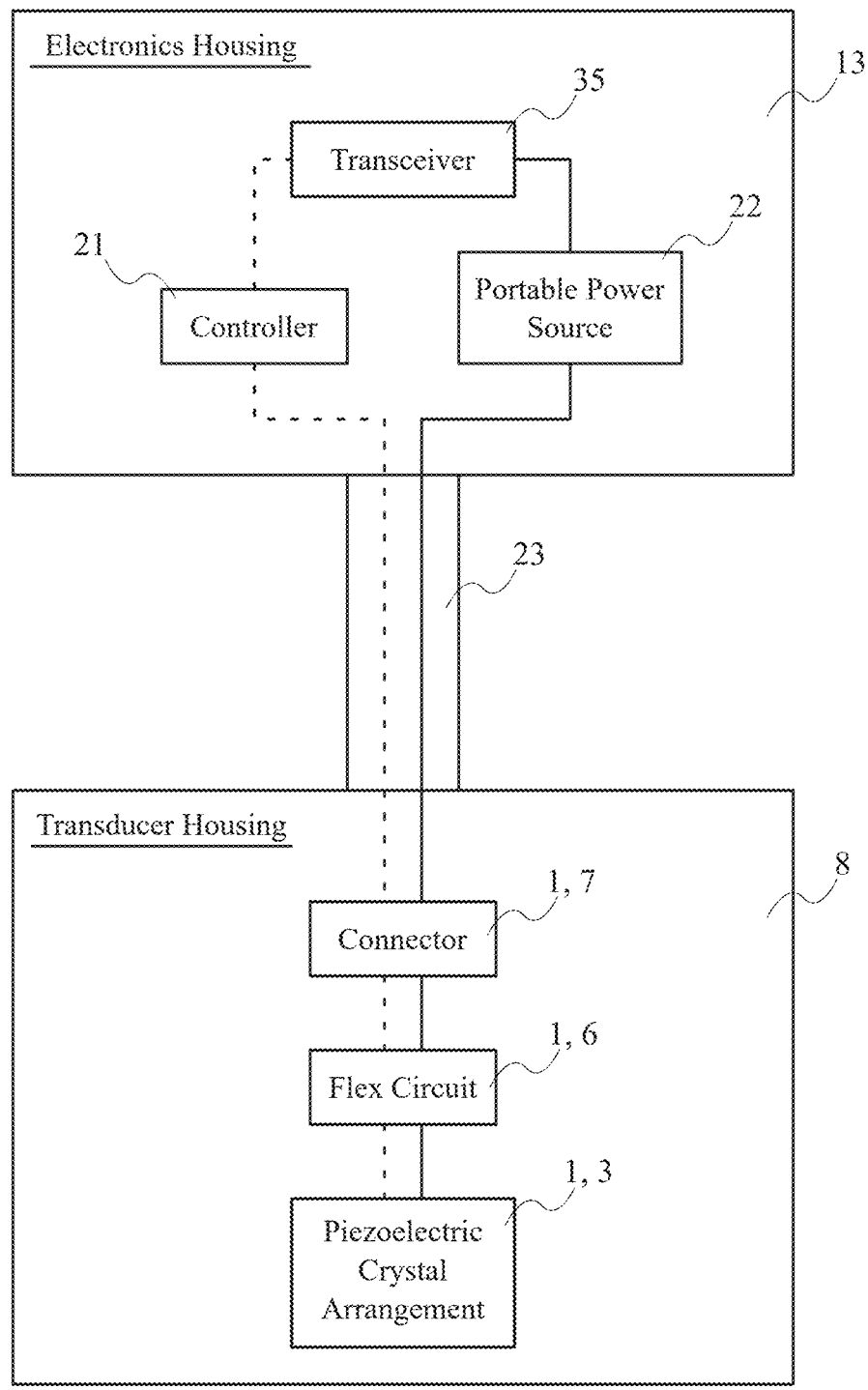
FIG. 14 is a box diagram showing the electrical connections and the electronic connections of the system of the present invention, wherein the electrical connections are shown in solid lines, and wherein the electronic connections are shown in dashed lines.
Figure 17:
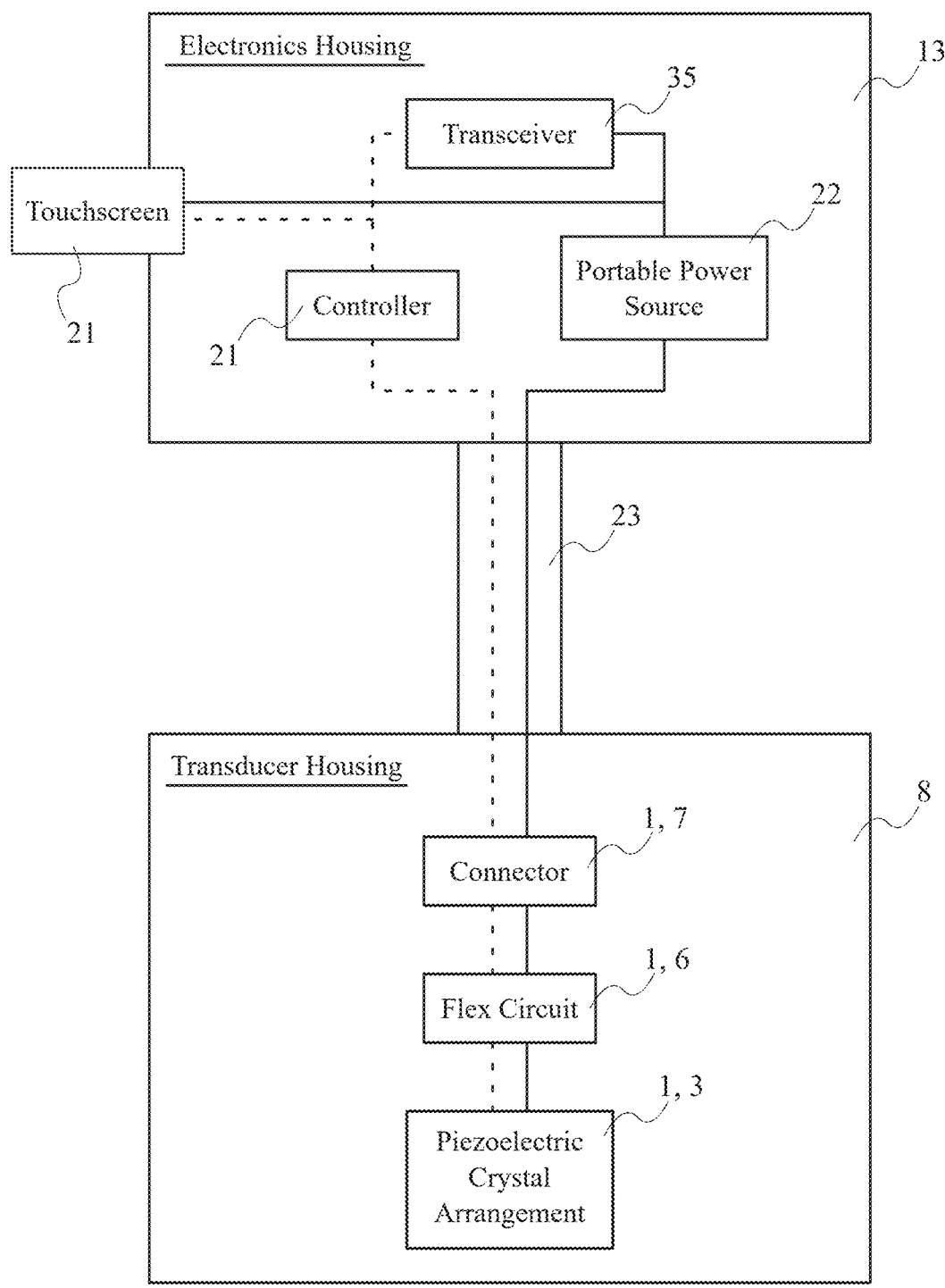
FIG. 17 is a box diagram showing the electrical connections and the electronic connections of the system of the present invention with an integrated touchscreen, wherein the electrical connections are shown in solid lines, and wherein the electronic connections are shown in dashed lines.

In addition, the connector 7 is mounted onto the flex circuit 6, opposite the stiffener 5, to secure the connector 7 to the flex circuit 6, as can be seen in FIGS. 14, 15, and 17. Moreover, the flex circuit 6 is electronically and electrically connected to the piezoelectric crystal arrangement 3 and the connector 7 to allow the transmission of data signals and electricity between the components. Further, the controller 21 is electronically connected to the connector 7 by the data/power cable 23 to enable the transmission of data signals between the controller 21 and the flex circuit 6. The portable power source 22 is also electrically connected to the connector 7 by the data/power cable 23 to enable the transmission of electricity between the portable power source 22 and the flex circuit 6. In other embodiments, different transducer technologies can be implemented as necessary.

Figure 4:
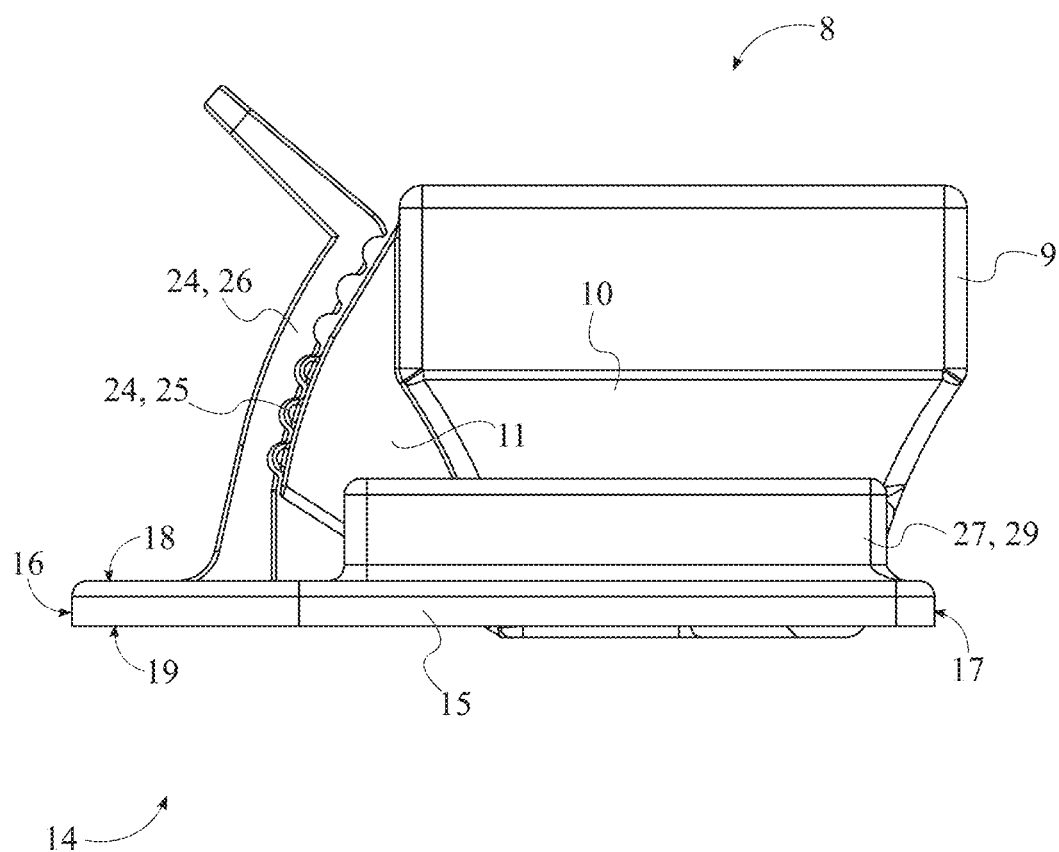
FIG. 4 is a left view of the system of the present invention, wherein the ratchet mechanism is shown engaged.
Figure 5:
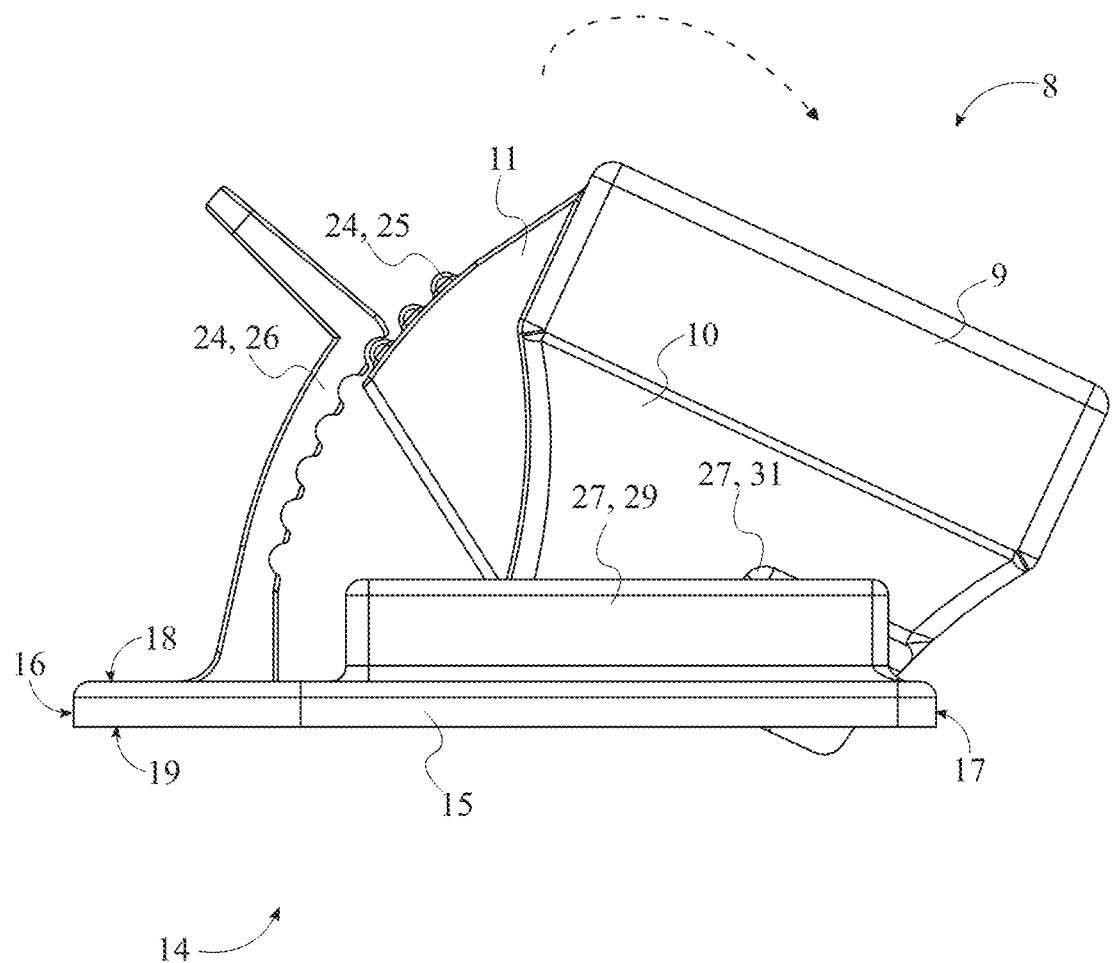
FIG. 5 is a left view of the system of the present invention, wherein the ratchet mechanism is shown partially disengaged.
Figure 6:
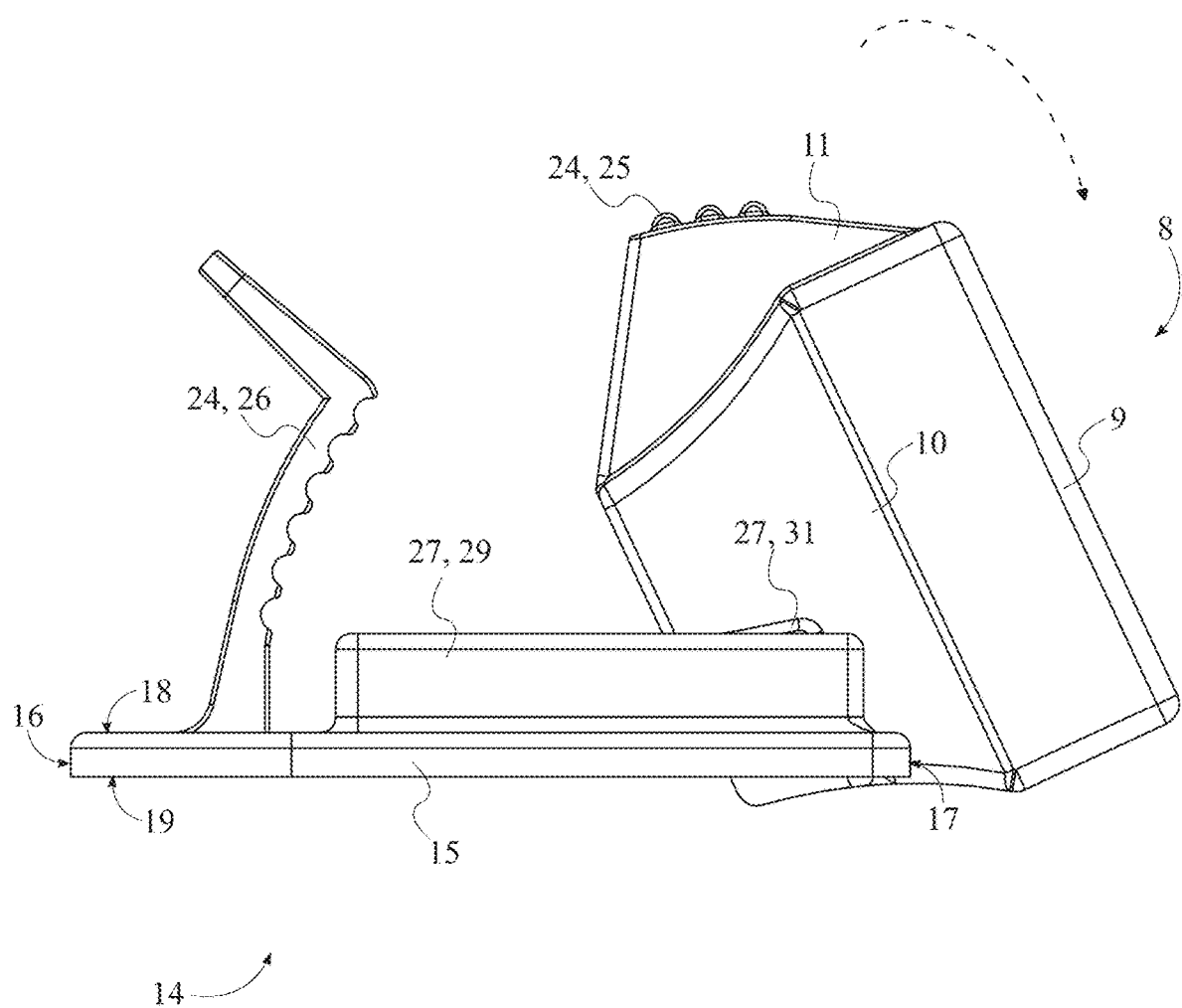
FIG. 6 is a left view of the system of the present invention, wherein the ratchet mechanism is shown fully disengaged.
Figure 7:
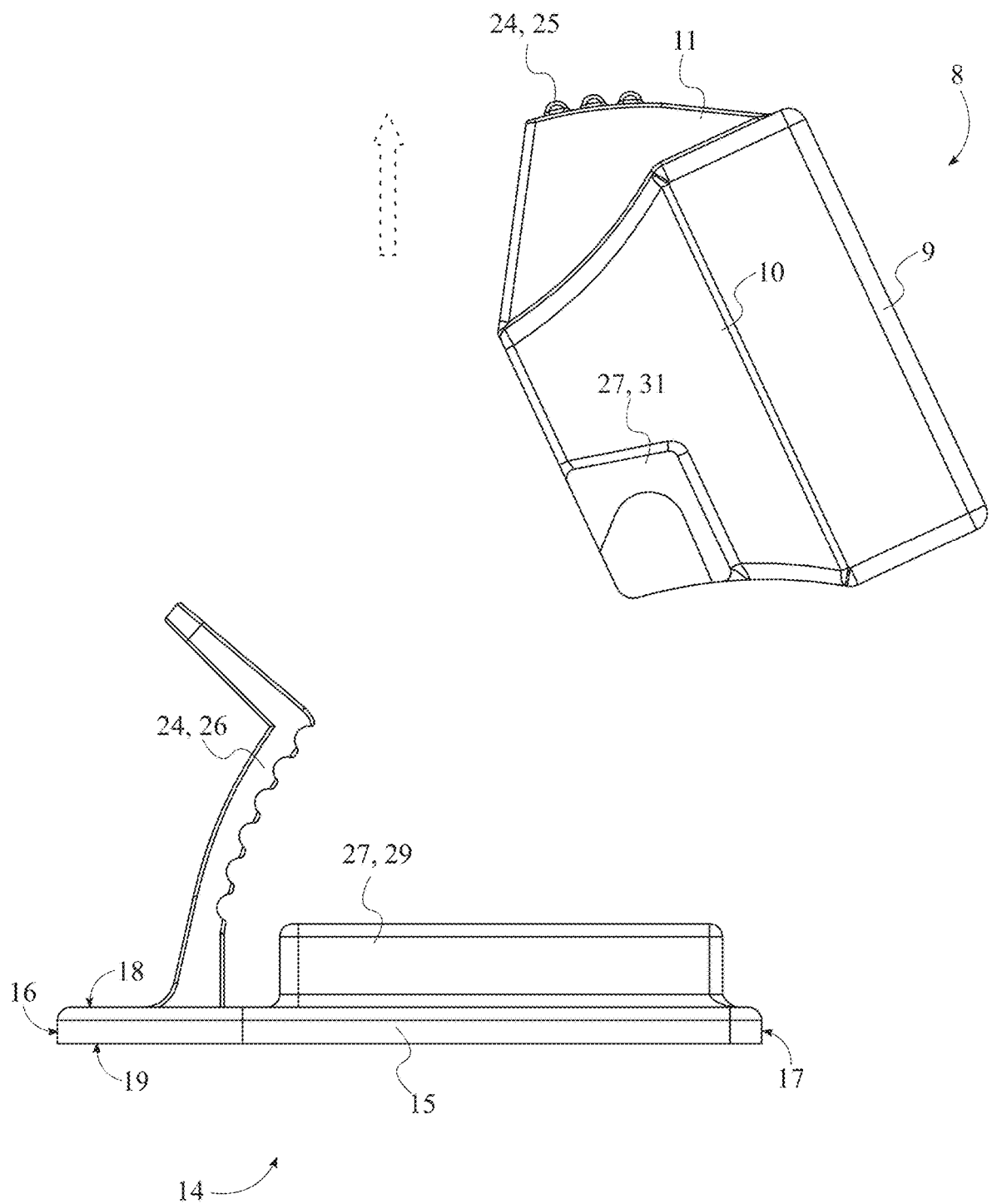
FIG. 7 is a left view of the system of the present invention, wherein the transducer housing is shown removed from the flat rigid interface.
Figure 8:
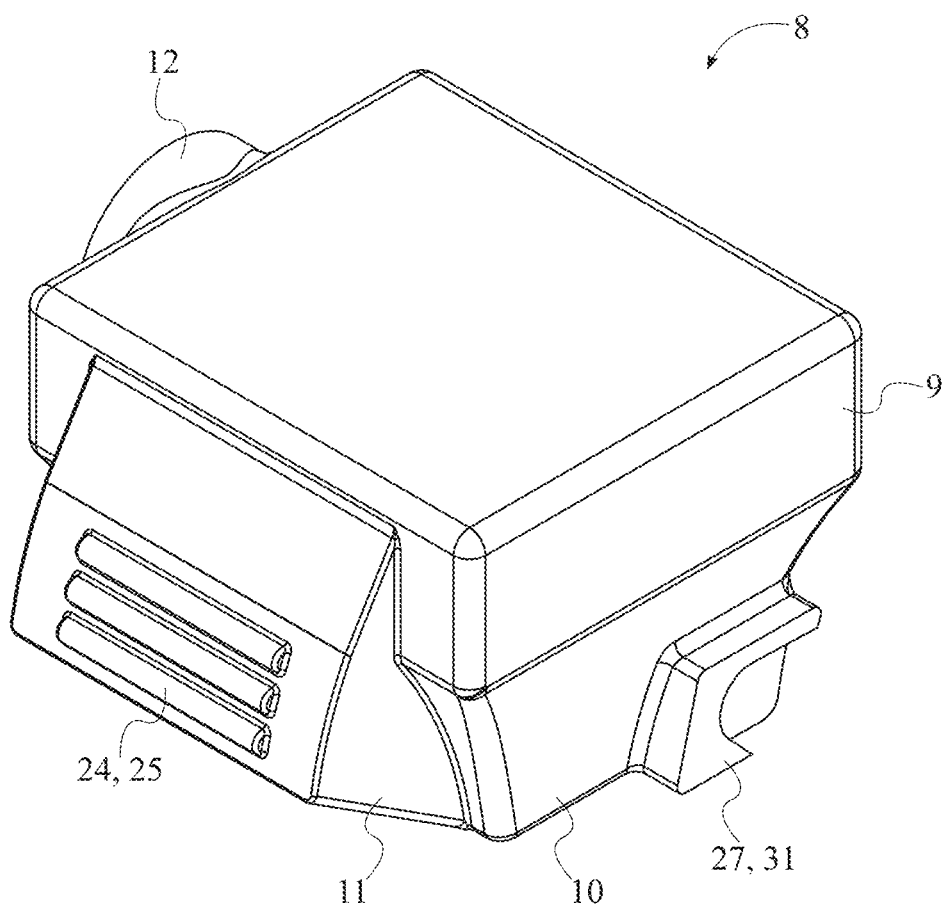
FIG. 8 is a top-front-left perspective view of the transducer housing of the system of the present invention.
Figure 9:
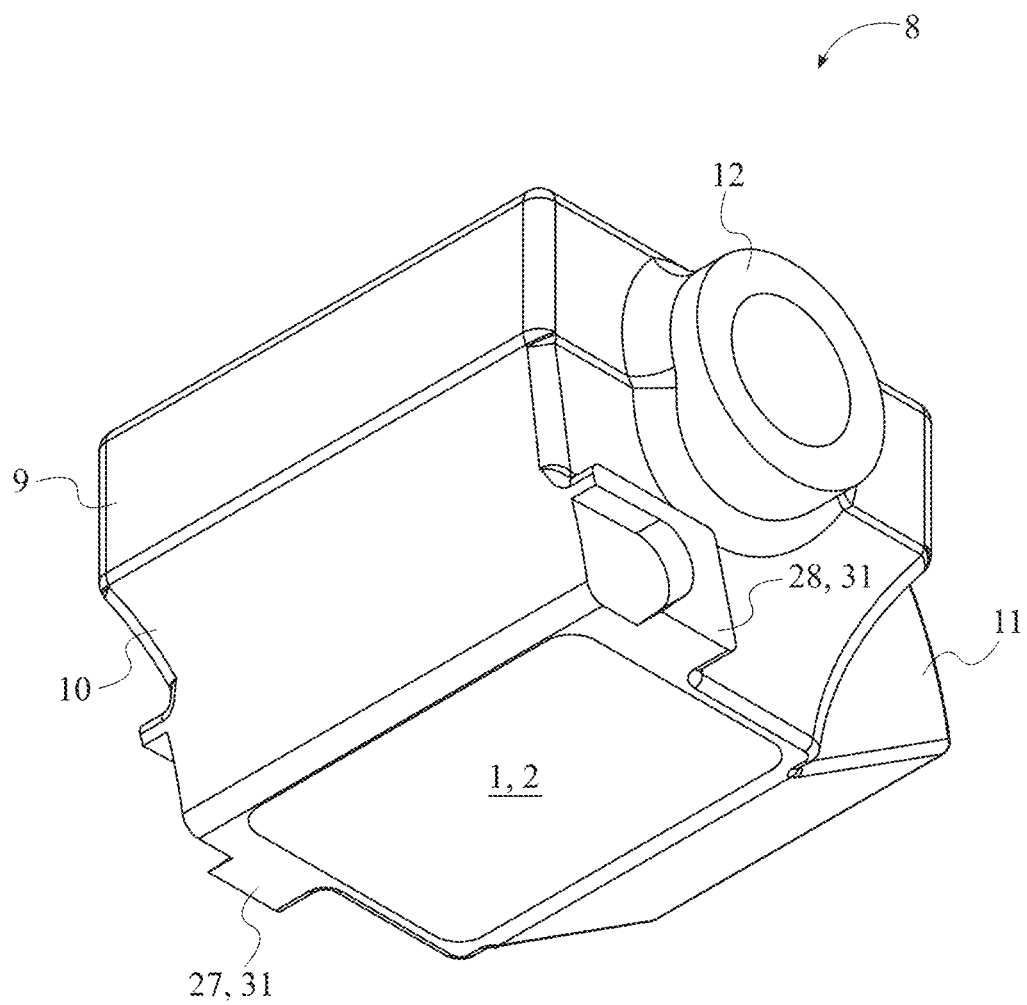
FIG. 9 is a bottom-rear-right perspective view of the transducer housing of the system of the present invention.
Figure 10:
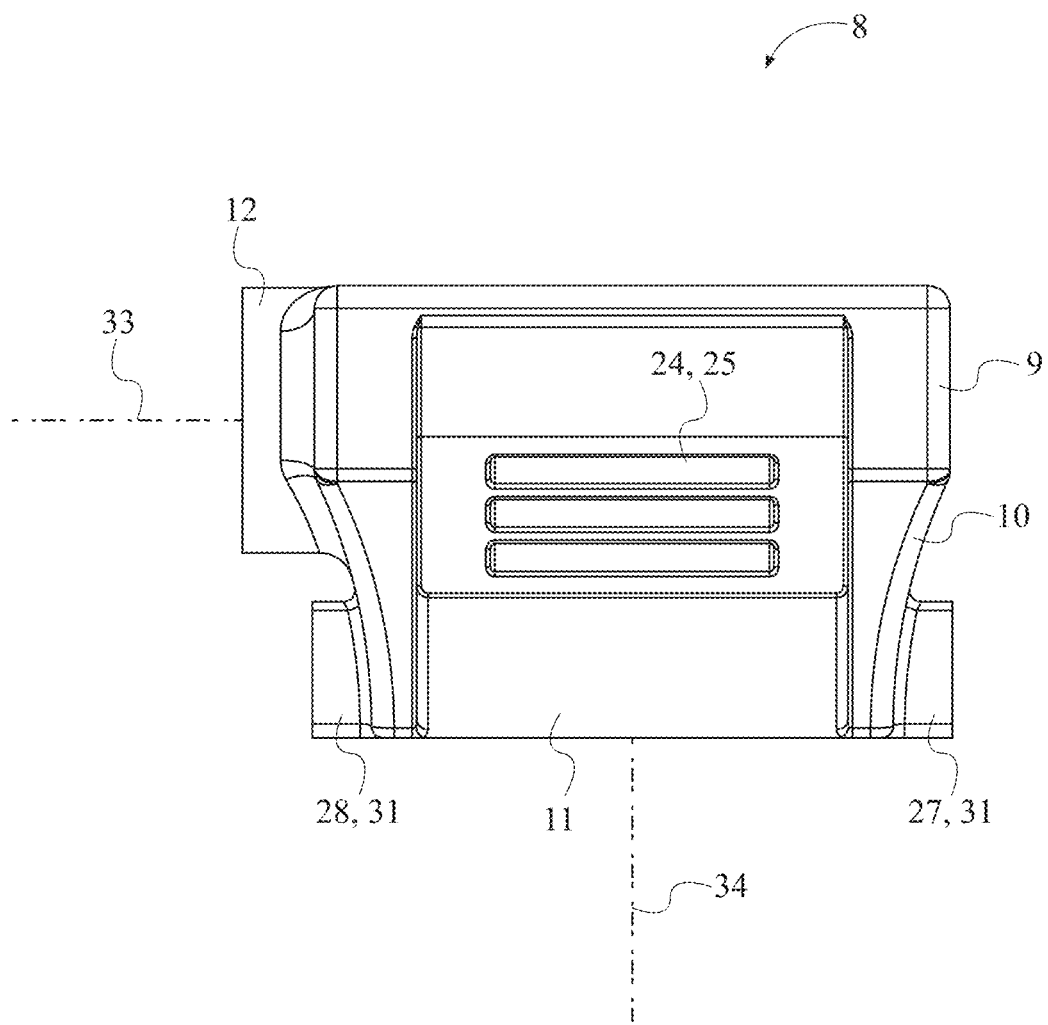
FIG. 10 is a front view of the transducer housing of the system of the present invention.
Figure 11:
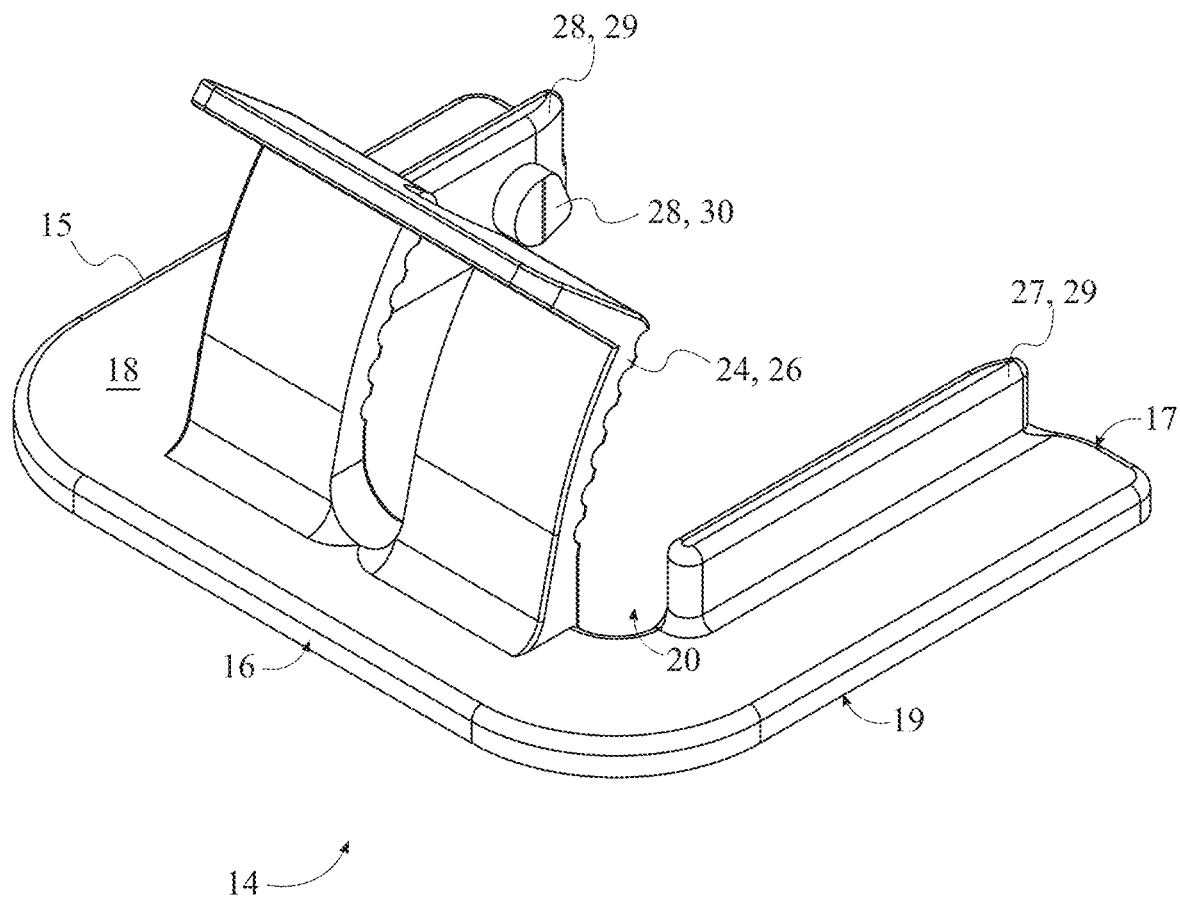
FIG. 11 is a top-front-left perspective view of the flat rigid interface of the system of the present invention.
Figure 12:
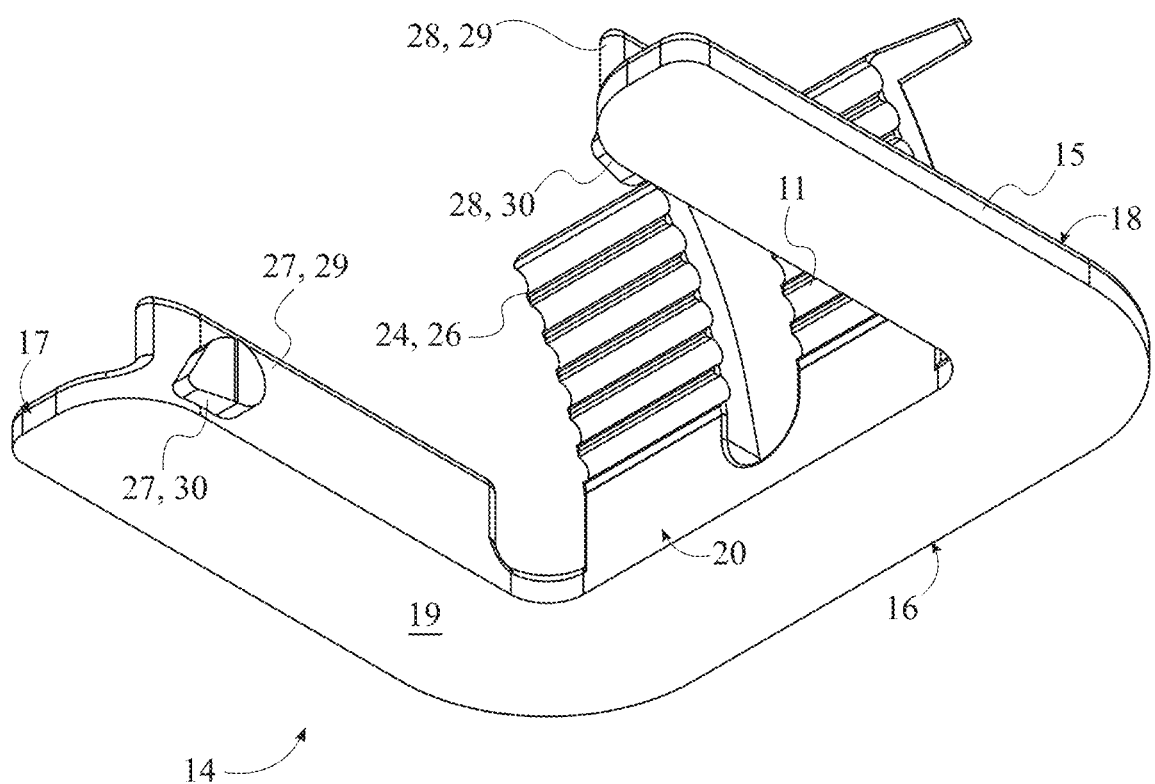
FIG. 12 is a bottom-rear-right perspective view of the flat rigid interface of the system of the present invention.

As previously discussed, the hinged connection between the transducer housing 8 and the flat rigid interface 14 and the ratchet mechanism 24 allows the adjustment of the angular orientation of the transducer housing 8 on the flat rigid interface 14. In the preferred embodiment, the footprint 2 and the piezoelectric crystal arrangement 3 can be oriented to the flat rigid interface 14 with a projected angle set between 120 degrees to 180 degrees, as can be seen in FIGS. 4 and 5. In other embodiments, the hinge connection and/or the ratchet mechanism 24 can be modified to accommodate a greater angular degree of freedom.

The present invention's system preferably enables the wireless transmission of the captured data to an external computing device, such as the patient's smartphone, which allows the captured data to be relayed to a healthcare database via an Internet connection. This allows the healthcare provider to monitor and analyze the captured data remotely. As can be seen in FIG. 14, to facilitate the wireless transmission of data, the present invention's system may further comprise a transceiver 35. The transceiver 35 enables the wireless transmission of the captured data using common wireless technologies including, but not limited to, short-range radio communication technologies, long-range radio communication technologies, etc.

In the preferred embodiment, the transceiver 35 is mounted within the electronics housing 13 so that the transceiver 35 is protected by the electronics housing 13, as can be seen in FIG. 14. The controller 21 is electronically connected to the transceiver 35 to enable the transmission of data signals between the controller 21 and the transceiver 35. Further, the portable power source 22 is electrically connected to the transceiver 35 to enable the transmission of electricity from the portable power source 22 to the transceiver 35. Additional features can be implemented on the data acquisition unit. For example, a power button can be implemented to allow the patient to selectively turn the system on or off. In other embodiments, different operational features can be implemented on the data acquisition unit.

Figure 16:
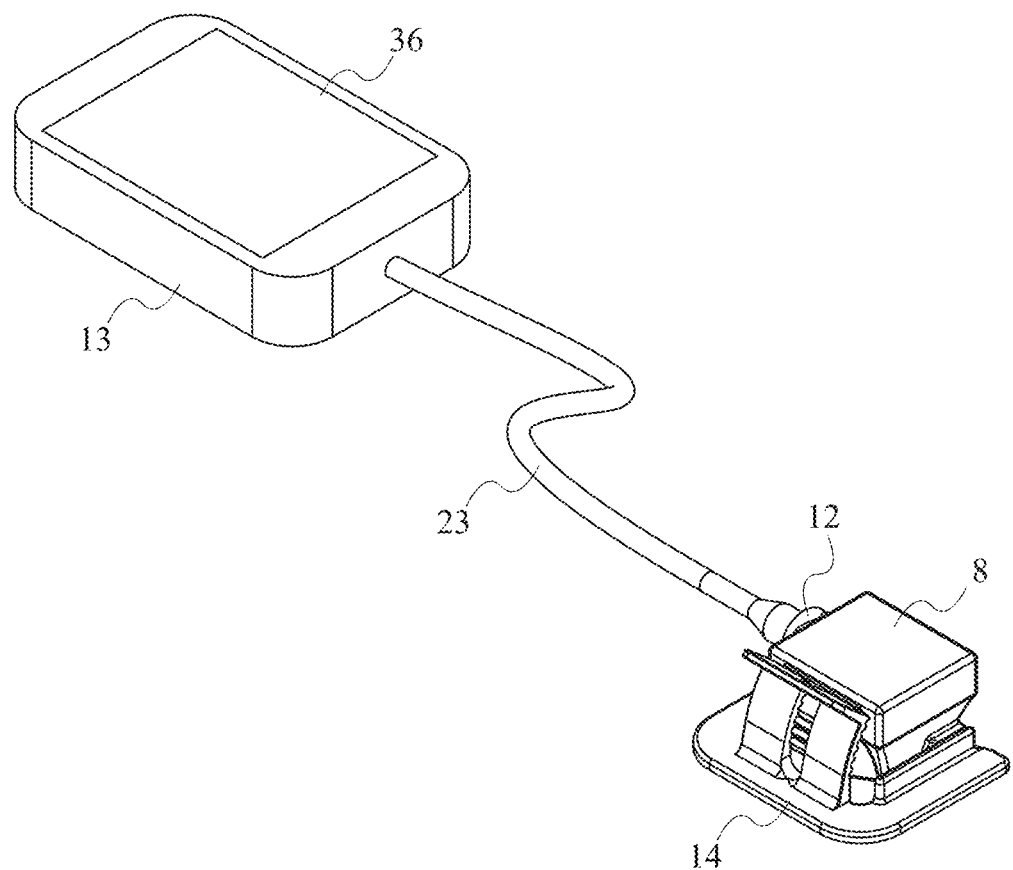
FIG. 16 is a top-front-left perspective view of the system of the present invention, wherein the data acquisition unit is shown with a touchscreen.

In another embodiment, the data acquisition unit of the present invention may include integrated means for the patient to directly engage the ultrasonic transducer 1 without the use of an external computing device. As can be seen in FIGS. 16 and 17, the present invention may further comprise a touchscreen 36 that allows the user to engage with the system directly. The touchscreen 36 can be integrated into the electronics housing 13 so that the patient can easily access the functions on the touchscreen 36. In addition, the controller 21 is electronically connected to the touchscreen 36 to enable the relay of command signals between the controller 21 and the touchscreen 36. Furthermore, the portable power source 22 is electrically connected to the touchscreen 36 to provide the electrical power necessary for the operation of the touchscreen 36. In other embodiments, different computational accessories can be integrated into the electronics housing 13 to enhance the system's functionality.

As previously discussed, the patient's computing device can include, but is not limited to, a smartphone or other computing devices capable of connecting to the Internet. The software application can be developed to be compatible with different computing devices. Further, the system's software application is designed to utilize the Internet connection of the patient's computing device to connect to the corresponding healthcare database from which the authorized healthcare provider can access the collected data for remote monitoring and examination. Like the patient's computing device, the healthcare provider can utilize a computing device that is connected to the corresponding healthcare database. Furthermore, the software application can be provided with different functions that enable the patient and/or the healthcare provider to control the system during the remote cardiac ultrasonic procedure.

The system of the present invention enables the method of remotely monitoring the cardiac ultrasonic of the patient. The overall setup process of the system starts by placing the flat rigid interface 14 in contact with the skin, above the heart, by the healthcare provider in the corresponding healthcare facility. The interface base 15 is oriented in such a way that a long axis parasternal view is captured during the cardiac ultrasonic. Then, the system's software application is installed on the patient's computing device for testing by the healthcare provider to ensure proper operation of the data acquisition unit and the ultrasonic transducer 1. The system's software application can be installed by the patient, or the healthcare provider can guide the patient on the installation process. Once the setup process is completed, the patient is sent home with a flat rigid interface 14 attached to the skin and the rest of the system.

The overall remote ultrasonic process of the present invention can include the following steps: the patient starts the remote cardiac ultrasonic by laying down on a flat surface such as a bed. The patient then removes the base cover of the flat rigid interface 14 and applies the coupling material within the transducer-receiving hole 20. The coupling material can include, but is not limited to, ultrasonic gel applied over the skin exposed within the transducer-receiving hole 20. Afterwards, the patient attaches the transducer housing 8 to the interface base 15 using the first hinge mechanism 27 and the second hinge mechanism 28. Then, the patient adjusts the position of the transducer housing 8 on the interface base 15 using the ratchet mechanism 24. During this step, the patient can be directed by the healthcare provider via the system's software application on the patient's computing device or using other communication protocols as established with the healthcare provider during the setup process.

Once the ultrasonic transducer 1 is properly positioned on the flat rigid interface 14, the patient activates the data acquisition unit and launches the system's software application on the patient's computing device. Afterwards, the cardiac ultrasonic procedure starts, and small ultrasonic loops are processed and recorded by the controller 21. The ultrasonic loops are preferably three to five seconds long as recommended by the healthcare provider. The captured data is processed and relayed to the patient's computing device via the transducer. Once the captured data is relayed to the patient's computing device, cine-loop analysis and ventricular function data calculations are performed, preferably using Artificial Intelligence (AI) algorithms implemented on the system's software application. Then, the analysis and calculation data is relayed to the corresponding healthcare database via the Internet connection of the patient's computing device.

During the remote cardiac ultrasonic procedure, the healthcare provider can access the analysis and calculation data from the corresponding healthcare database for review and evaluation. Once the remote cardiac ultrasonic procedure is completed, the patient can turn off the data acquisition unit and remove the transducer housing 8 from the flat rigid interface 14. The uncoupling process involves first disengaging the ratchet mechanism 24 by pulling the ratchet rack 26 away from the ratchet pawl 25. Then, the patient rotates the transducer housing 8 until the first hinge mechanism 27 and the second hinge mechanism 28 can also be disengaged. Then, the patient can safely remove the transducer housing 8 from the flat rigid interface 14. Afterwards, the user can clean the skin and cover the flat rigid interface 14 with the base cover. In other embodiments, the present invention can be modified to accommodate different examination functions or other subprocess related to the remote cardiac ultrasonic procedure.

Although the invention has been explained in relation to its preferred embodiment, it is to be understood that many other possible modifications and variations can be made without departing from the spirit and scope of the invention.

What is claimed is:

1. A system for remote cardiac ultrasonic monitoring comprising:
an ultrasonic transducer;
a transducer housing;
an electronics housing;
a flat rigid interface;
a controller;
a portable power source;
a data/power cable;
a ratchet mechanism;
the transducer housing comprising an upper housing base and a lower housing base;
the ultrasonic transducer being mounted within the transducer housing, adjacent to the lower housing base;
the controller and the portable power source being mounted within the electronics housing;
the electronics housing being tethered to the transducer housing by the data/power cable;
the transducer housing being hingedly connected to the flat rigid interface;
the ratchet mechanism being operatively coupled between the flat rigid interface and the transducer housing, wherein the ratchet mechanism is used to incrementally orient the transducer housing at a specific angle with the flat rigid interface;
the portable power source being electrically connected to the controller;
the controller being electronically connected to the ultrasonic transducer by the data/power cable; and
the portable power source being electrically connected to the ultrasonic transducer by the data/power cable.

2. The system for remote cardiac ultrasonic monitoring as claimed in claim 1 further comprising:
the flat rigid interface comprising an interface base and a transducer-receiving hole;
the interface base comprising a proximal base edge, a distal base edge, an upper base face, and a lower base face;
the proximal base edge being positioned opposite the distal base edge across the interface base;
the upper base face being positioned opposite the lower base face about the interface base;
the transducer-receiving hole traversing from the upper base face, through the interface base, and to the lower base face;
the transducer-receiving hole further traversing from the distal base edge and into the interface base;
the transducer housing being aligned with the transducer-receiving hole; and
the transducer housing being hingedly mounted to the upper base face, adjacent to the distal base edge.

3. The system for remote cardiac ultrasonic monitoring as claimed in claim 2 further comprising:
the ratchet mechanism comprising a ratchet pawl and a ratchet rack;
the transducer housing further comprising a slanted protrusion;
the ratchet rack being connected onto the upper base face, adjacent to the proximal base edge;
the ratchet rack being oriented towards the distal base edge;
the slanted protrusion being laterally connected to the transducer housing in between the upper housing base and the lower housing base;
the slanted protrusion being positioned adjacent to the ratchet rack;
the ratchet pawl being connected onto the slanted protrusion, offset from the transducer housing;
the ratchet pawl being oriented towards the ratchet rack; and
the ratchet pawl being selectively engaged with the ratchet rack.

4. The system for remote cardiac ultrasonic monitoring as claimed in claim 2 further comprising:
a first hinge mechanism;
a second hinge mechanism;
the first hinge mechanism and the second hinge mechanism each comprising a flat protrusion, a hinge pin, and a pin hook;
the first hinge mechanism and the second hinge mechanism being positioned opposite to each other about the transducer housing;
the flat protrusion of the first hinge mechanism being connected onto the upper base face, adjacent to the transducer-receiving hole;
the flat protrusion of the second hinge mechanism being connected onto the upper base face, adjacent to the transducer-receiving hole;
the hinge pin being connected onto the flat protrusion;
the hinge pin of the first hinge mechanism and the hinge pin of the second hinge mechanism being oriented towards each other;
the hinge pin of the first hinge mechanism and the hinge pin of the second hinge mechanism being concentrically positioned to each other;
the pin hook of the first hinge mechanism and the pin hook of the second hinge mechanism being laterally integrated into the transducer housing, adjacent to the lower housing base; and
the hinge pin being rotatably attached into the pin hook.

5. The system for remote cardiac ultrasonic monitoring as claimed in claim 2 further comprising:
a quantity of adhesive; and
the quantity of adhesive being superimposed across the lower base face.

6. The system for remote cardiac ultrasonic monitoring as claimed in claim 1 further comprising:
the transducer housing comprising a cable port;
the cable port being laterally integrated into the transducer housing, adjacent to the upper housing base;
a central axis of the cable port being positioned perpendicular to an emission axis of the ultrasonic transducer; and
the data/power cable being terminally attached into the cable port.

7. The system for remote cardiac ultrasonic monitoring as claimed in claim 1 further comprising:
the ultrasonic transducer comprising a footprint, a piezoelectric crystal arrangement, a backing, a stiffener, a flex circuit, and a connector;
the footprint being integrated into the lower housing base;
the piezoelectric crystal arrangement being mounted within the transducer housing, adjacent to the footprint;
the backing being mounted across the piezoelectric crystal arrangement, opposite to the footprint;
the stiffener being mounted across the backing, opposite to the piezoelectric crystal arrangement;
the flex circuit being mounted across the stiffener, opposite to the backing;
the connector being mounted onto the flex circuit, opposite the stiffener;

the flex circuit being electronically and electrically connected to the piezoelectric crystal arrangement and the connector;
the controller being electronically connected to the connector by the data/power cable; and
the portable power source being electrically connected to the connector by the data/power cable.

8. The system for remote cardiac ultrasonic monitoring as claimed in claim 7, wherein the footprint and the piezoelectric crystal arrangement are oriented to the flat rigid interface with a projected angle set between 120 degrees to 180 degrees.

9. The system for remote cardiac ultrasonic monitoring as claimed in claim 1 further comprising:
a transceiver;
the transceiver being mounted within the electronics housing;
the controller being electronically connected to the transceiver; and
the portable power source being electrically connected to the transceiver.

10. The system for remote cardiac ultrasonic monitoring as claimed in claim 1 further comprising:
a touchscreen;
the touchscreen being integrated into the electronics housing;
the controller being electronically connected to the touchscreen; and
the portable power source being electrically connected to the touchscreen.

11. A system for remote cardiac ultrasonic monitoring comprising:
an ultrasonic transducer;
a transducer housing;
an electronics housing;
a flat rigid interface;
a controller;
a portable power source;
a data/power cable;
a ratchet mechanism;
a quantity of adhesive;
the transducer housing comprising an upper housing base and a lower housing base;
the flat rigid interface comprising an interface base and a transducer-receiving hole;
the interface base comprising a proximal base edge, a distal base edge, an upper base face, and a lower base face;
the ultrasonic transducer being mounted within the transducer housing, adjacent to the lower housing base;
the controller and the portable power source being mounted within the electronics housing;
the electronics housing being tethered to the transducer housing by the data/power cable;
the proximal base edge being positioned opposite the distal base edge across the interface base;
the upper base face being positioned opposite the lower base face about the interface base;
the transducer-receiving hole traversing from the upper base face, through the interface base, and to the lower base face;
the transducer-receiving hole further traversing from the distal base edge and into the interface base;
the transducer housing being aligned with the transducer-receiving hole;
the transducer housing being hingedly mounted to the upper base face, adjacent to the distal base edge;
the ratchet mechanism being operatively coupled between the flat rigid interface and the transducer housing, wherein the ratchet mechanism is used to incrementally orient the transducer housing at a specific angle with the flat rigid interface;
the portable power source being electrically connected to the controller;
the controller being electronically connected to the ultrasonic transducer by the data/power cable;
the portable power source being electrically connected to the ultrasonic transducer by the data/power cable; and
the quantity of adhesive being superimposed across the lower base face.

12. The system for remote cardiac ultrasonic monitoring as claimed in claim 11 further comprising:
the ratchet mechanism comprising a ratchet pawl and a ratchet rack;
the transducer housing further comprising a slanted protrusion;
the ratchet rack being connected onto the upper base face, adjacent to the proximal base edge;
the ratchet rack being oriented towards the distal base edge;
the slanted protrusion being laterally connected to the transducer housing in between the upper housing base and the lower housing base;
the slanted protrusion being positioned adjacent to the ratchet rack;
the ratchet pawl being connected onto the slanted protrusion, offset from the transducer housing;
the ratchet pawl being oriented towards the ratchet rack; and
the ratchet pawl being selectively engaged with the ratchet rack.

13. The system for remote cardiac ultrasonic monitoring as claimed in claim 11 further comprising:
a first hinge mechanism;
a second hinge mechanism;
the first hinge mechanism and the second hinge mechanism each comprising a flat protrusion, a hinge pin, and a pin hook;
the first hinge mechanism and the second hinge mechanism being positioned opposite to each other about the transducer housing;
the flat protrusion of the first hinge mechanism being connected onto the upper base face, adjacent to the transducer-receiving hole;
the flat protrusion of the second hinge mechanism being connected onto the upper base face, adjacent to the transducer-receiving hole;
the hinge pin being connected onto the flat protrusion;
the hinge pin of the first hinge mechanism and the hinge pin of the second hinge mechanism being oriented towards each other;
the hinge pin of the first hinge mechanism and the hinge pin of the second hinge mechanism being concentrically positioned to each other;
the pin hook of the first hinge mechanism and the pin hook of the second hinge mechanism being laterally integrated into the transducer housing, adjacent to the lower housing base; and
the hinge pin being rotatably attached into the pin hook.

14. The system for remote cardiac ultrasonic monitoring as claimed in claim 11 further comprising:
the transducer housing comprising a cable port;
the cable port being laterally integrated into the transducer housing, adjacent to the upper housing base;

a central axis of the cable port being positioned perpendicular to an emission axis of the ultrasonic transducer; and the data/power cable being terminally attached into the cable port.

15. The system for remote cardiac ultrasonic monitoring as claimed in claim 11 further comprising:

the ultrasonic transducer comprising a footprint, a piezoelectric crystal arrangement, a backing, a stiffener, a flex circuit, and a connector;

the footprint being integrated into the lower housing base;

the footprint and the piezoelectric crystal arrangement being oriented to the flat rigid interface with a projected angle set between 120 degrees to 180 degrees;

the piezoelectric crystal arrangement being mounted within the transducer housing, adjacent to the footprint;

the backing being mounted across the piezoelectric crystal arrangement, opposite to the footprint;

the stiffener being mounted across the backing, opposite to the piezoelectric crystal arrangement;

the flex circuit being mounted across the stiffener, opposite to the backing;

the connector being mounted onto the flex circuit, opposite the stiffener;

the flex circuit being electronically and electrically connected to the piezoelectric crystal arrangement and the connector;

the controller being electronically connected to the connector by the data/power cable; and the portable power source being electrically connected to the connector by the data/power cable.

16. The system for remote cardiac ultrasonic monitoring as claimed in claim 11 further comprising:

a transceiver;

the transceiver being mounted within the electronics housing;

the controller being electronically connected to the transceiver; and the portable power source being electrically connected to the transceiver.

17. The system for remote cardiac ultrasonic monitoring as claimed in claim 11 further comprising:

a touchscreen;

the touchscreen being integrated into the electronics housing;

the controller being electronically connected to the touchscreen; and the portable power source being electrically connected to the touchscreen.

* * * * *